United States Patent [19]

Hamatsu et al.

[11] Patent Number: 4,785,410
[45] Date of Patent: Nov. 15, 1988

[54] MAXIMUM LENGTH SHIFT REGISTER SEQUENCES GENERATOR

[75] Inventors: Masahiro Hamatsu; Takao Kurihara, both of Tokyo, Japan

[73] Assignee: Clarion Co., Ltd., Tokyo, Japan

[21] Appl. No.: 870,204

[22] Filed: Jun. 2, 1986

[30] Foreign Application Priority Data

Jun. 5, 1985 [JP] Japan .................................. 60-122070
Jun. 5, 1985 [JP] Japan .................................. 60-122071

[51] Int. Cl.$^4$ ................................................ G06F 1/02
[52] U.S. Cl. .................................................. 364/717
[58] Field of Search ................... 364/717; 380/46, 50; 375/115

[56] References Cited

U.S. PATENT DOCUMENTS

| | | | |
|---|---|---|---|
| 3,515,805 | 6/1970 | Fracassi et al. | 380/46 |
| 3,681,708 | 8/1972 | Olmstead | 380/46 |
| 3,700,806 | 10/1972 | Vasseur | 380/46 |
| 3,746,847 | 6/1973 | Marutsas | 364/717 |
| 3,920,894 | 11/1975 | Shirley et al. | 364/717 |
| 3,946,215 | 3/1976 | May | 364/717 |
| 4,291,386 | 9/1981 | Bass | 364/717 |
| 4,355,366 | 10/1982 | Porter | 364/717 |
| 4,375,620 | 3/1983 | Singer et al. | 364/717 |
| 4,493,046 | 1/1985 | Watanabe | 364/717 |
| 4,511,988 | 4/1985 | Michel et al. | 364/717 |
| 4,611,183 | 9/1986 | Piosenka et al. | 364/717 |

Primary Examiner—Gary V. Harkcom
Assistant Examiner—Dale M. Shaws
Attorney, Agent, or Firm—Flynn, Thiel, Boutell & Tanis

[57] ABSTRACT

A maximum length shift register sequence generator capable of changing the format and phase of an M code known as maximum length shift register sequences in the transmitter and receiver. The register is most suitable for use in spread spectrum communication systems adapted to effect transmission by correlation between an M code from the transmitter and such an M code generated in the receiver. The generator includes a latch for storing the format and initial phase of an M code to be generated subsequently, and a microprocessor for setting in the latch necessary data required for changing the M code. A change of the M code is effected by a strobe signal lasting for a time equal to the lasting time of one clock pulse.

8 Claims, 3 Drawing Sheets

MAXIMUM LENGTH SHIFT REGISTER SEQUENCES GENERATOR

FIELD OF THE INVENTION

This invention relates to a maximum length shift register sequences generator suitable for signal hiding or privacy and used in a spread spectrum communication system which is adapted to effect communication by correlation between an M code known as maximum length shift register sequences from the transmitter's station and such an M code generated by a receiver system.

BACKGROUND OF THE INVENTION

An M code known as maximum length shift register sequences is a linear code which can be produced by a significantly simple circuit arrangement, and hence is used widely in spread spectrum communication systems. FIG. 5 is a block diagram of a prior art simple-type M code generator including flip-flops $SR_1$ through $SR_6$, an exclusive OR gate $\oplus$, an input terminal IN receiving a clock pulse CL and an output terminal OUT outputting an M code responsive to the incoming clock pulse CL in a known fashion.

Due to the linearity, M codes are inferior to nonlinear codes from a standpoint of signal hiding. Therefore, M codes have not been regarded as important when a high privacy is required.

OBJECT OF THE INVENTION

It is therefore an object of the invention to provide an M code generator ensuring a high secrecy or privacy in a spread spectrum communication system or the like.

SUMMARY OF THE INVENTION

According to the invention, there is provided a maximum length shift register sequences generator comprising:

a plurality of flip-flops;

a plurality of switching gates each located at the input stage of and series-connected to one of said flip-flops;

means for applying a clock pulse to said flip-flops;

a plurality of AND gates each having two input terminals one of which is connected to the output of one of said flip-flops;

means for feeding respective outputs of said AND gates back to the first stage one of said switching gates;

first latch means for setting and holding an initial formation of said flip-flops;

second latch means for supplying the other input terminal of each said AND gate with a feedback holding signal for holding the feedback formation of the outputs of said flip-flops;

means for applying a gate control strobe pulse to said switching gates;

a microprocessor responsive to said strobe pulse to supply said first and second latch means with an instruction signal which instructs the initial formation and feedback formation of said flip-flops; and means for extracting an M code from the output of the first stage one of said flip-flops.

Since different formations of the series-connected flip-flops are selectively fixed by the latch means, and the latching modes of the latch means can be successively changed, an M code output of the invention system may be successively changed in format and phase. Therefore, regardless of the use of a linear M code, the invention system ensures a high signal hiding and privacy in communication.

DETAILED DESCRIPTION

Figure 1:
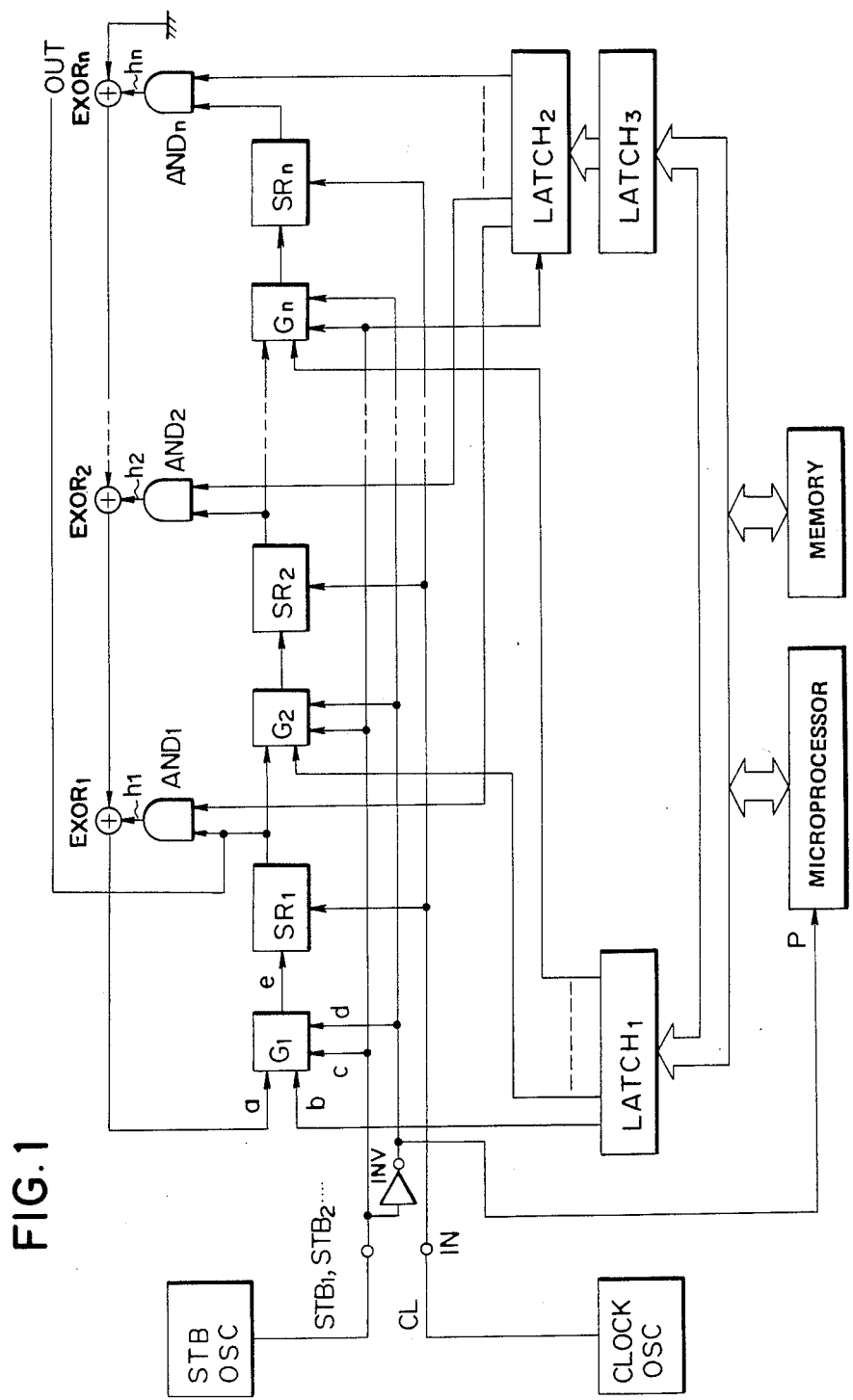
FIG. 1 is a block diagram of a simple-type M code generator in a spread spectrum communication system embodying the invention.

The invention is hereinbelow described in detail, referring to preferred embodiments illustrated in the drawings.

Figure 2:
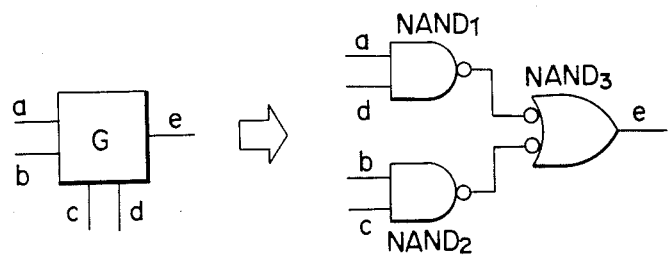
FIG. 2 is an arrangement of a switching gate circuit involved in the circuit of FIG. 1.

FIG. 1 is a block diagram of a simple-type M code generator embodying the invention for the best use in a spread spectrum communication system. The M code generator includes flip-flops $SR_1$ through $SR_n$ all connected in series. To individual inputs of the flip-flops $SR_1$ to $SR_n$ are connected switching gate circuits $G_l$ through $G_n$ each of which may consists of NAND gates $NAND_1$ to $NAND_3$ as shown in FIG. 2. Individual outputs of the flip-flops $SR_l$ to $SR_n$ are fed back to the first-stage flip-flop via AND gates $AND_l$ to $AND_n$ and via exclusive OR gates $EXOR_1$ to $EXOR_n$. A latch 1 latches an initial formation of the flip-flops determined by a selected combination of two stages of respective flip-flops, and a latch 2 controls the AND gates. These latches effect their operations in response to an instruction signal supplied from a microprocessor. A memory stores a program for performing different steps of these control operations. A strobe signal oscillator STB OSC and a clock signal oscillator CLOCK OSC adapted to enter strobe and clock signals in the M code generator may be those included in the transmitter's or receiver's computer in the spread spectrum system, for example.

Figure 5:
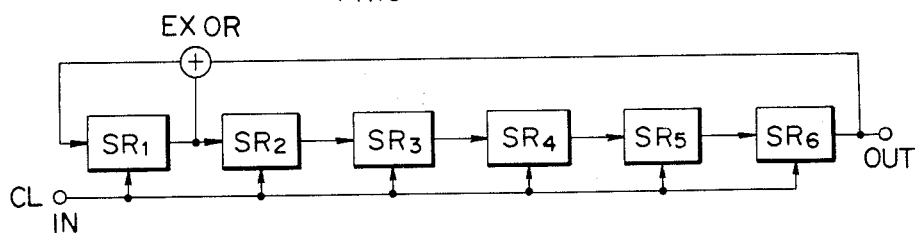
FIG. 5 is a block diagram of a prior art simple-type M code generator.

Comparing FIG. 1 to FIG. 5, it is apparent that the flip-flops $SR_l$ to $SR_n$ in FIG. 1 can take the same circuit condition as in FIG. 5 and hence can produce the same M code as in the prior art.

According to the invention, however, the M code can be changed as desired in format and in phase in the following fashion.

Assume here that an M code (first version M code) is now supplied from an M code output terminal OUT. At that time, if a strobe pulse STB1 is entered, the system operates as follows.

Figure 3:
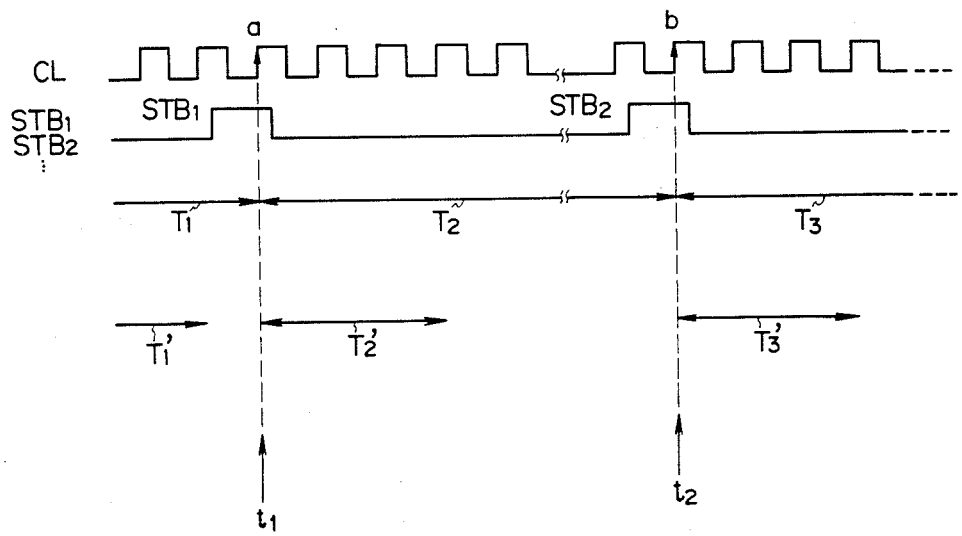
FIG. 3 is a timing chart for explanation of the 10 operation of the system in FIG. 1.

A data from the latch 1 is entered in the flip-flops $SR_l$ to $SR_n$ through the gate circuits $G_l$ to $G_n$ and is set at the inputs thereof. As shown in FIG. 3, the data appears at the outputs of the flip-flops in response to a rising edge $\alpha$ of the clock pulse CL. The data from the latch 1 means the initial formation of the flip-flops $SR_l$ to $SR_n$.

A data of the latch 3 is outputted from the latch 2, and the AND gate circuits $AND_l$ to $AND_n$ are thereby changed to "on". Therefore feedback lines $h_1$ through $h_n$ are changed to a formation capable of generating a second version M code therefrom.

As the result, the M code output terminal supplies the second version M code in response to the clock pulse CL after the rising edge α. That is, the M code is changed from the first version to the second version.

On the other hand, the strobe pulse STB1 is applied to the microprocessor via an inverter INV so as to be used also as an interruption pulse P which triggers the microprocessor for preparation of a third version M code to be generated subsequently. That is, the microprocessor, when triggered by the interruption pulse P, sets in the latch 1 and latch 3 respectively an instruction signal which instructs the initial formation of the flip-flops $SR_I$ to $SR_n$ and an on-off combination of the AND gates $AND_I$ to $AND_n$ (feedback formation of the flip-flops) required for generation of the third version M code.

Also when a strobe pulse STB2 is entered in the system, the M code is changed from the second version to the third version.

In FIG. 3, reference numerals $T_1$ through $T_3$ indicate periods for generation of the first, second and third versions of the M code, respectively, and $T_1$, through $T_3'$ indicate times during the periods $T_1$ to $T_3$ required for preparation of an instruction signal for generation of a subsequent version M code in the subsequent period $T_1$, $T_2$ or $T_3$. Namely, $T_1'$ is the time for the second version M code, $T_2'$ is for the third version M code, and $T_3'$ is for the first version M code. Reference numerals $t_1$ and $t_2$ indicate timings for changing the M code from the first to second version or from the second to third version.

Figure 4:
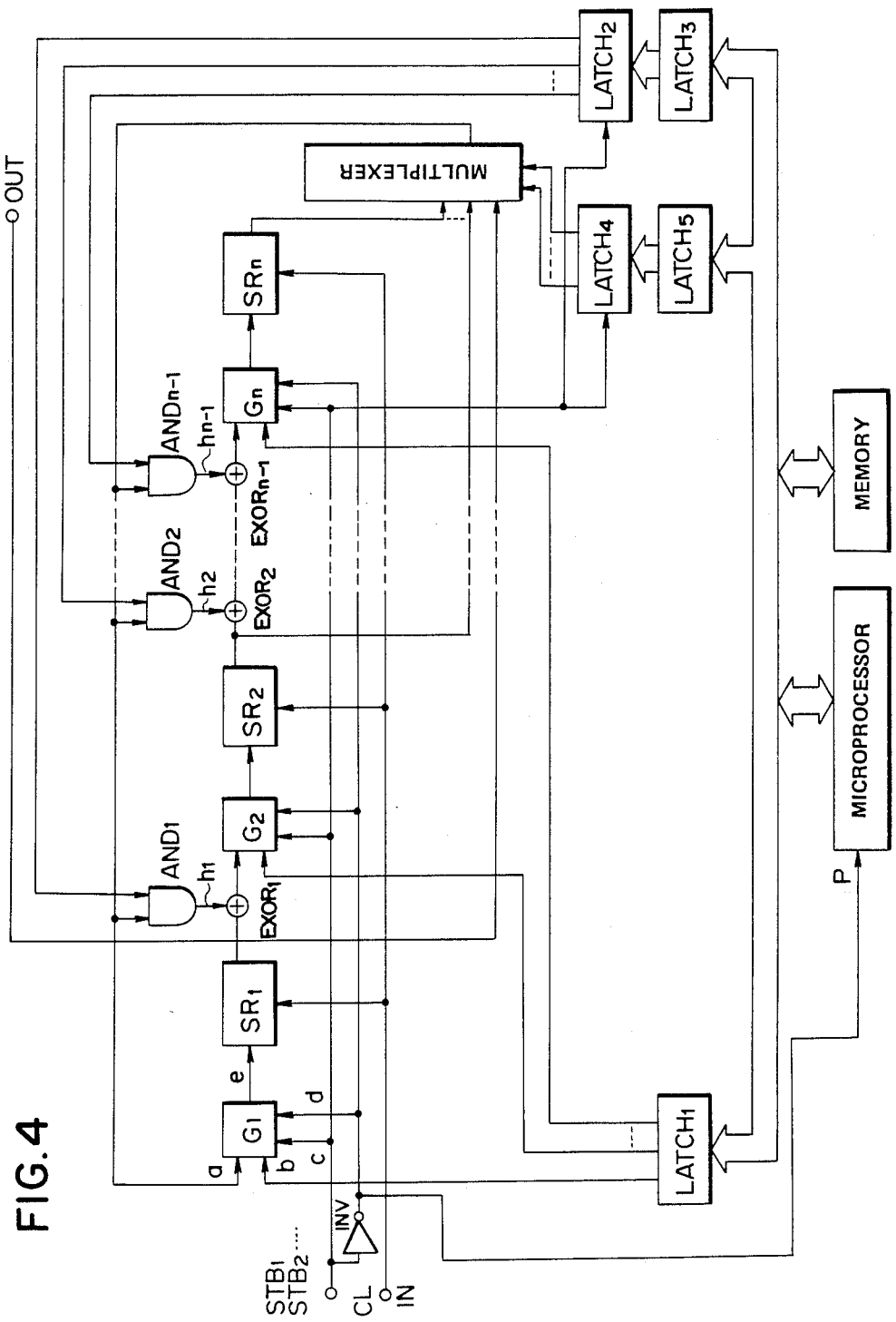
FIG. 4 is an alternative of the arrangement of FIG. 1.

FIG. 4 shows a different arrangement of the circuit of FIG. 1, and is simply different from FIG. 1 in that latches 4 and 5 and a multiplexer are further provided; respective outputs of the flip-flops are fed back to the first stage switching gate $G_1$ via the multiplexer; and respective exclusive OR gates $EXOR_1$ to $EXOR_{n-1}$ are each connected between an associated one of the flip-flops and a subsequent stage switching gate.

The basic operation for M code generation by the arrangement of FIG. 4 is identical to that by the arrangement of FIG. 1. However, in FIG. 4, the multiplexer controls the feedback of respective flip-flops to the switching gate $G_1$ in response to an instruction supplied from the microprocessor via the latches 4 and 5, and the exclusive OR gates are controlled by the multiplexer and latch 2. Therefore, the arrangement of FIG. 4 enables a larger variation of the M code in format and phase than the arrangement of FIG. 1.

As described, since the invention arrangement enables successive changes of the M code in format and phase, it ensures a high secrecy or privacy in communication regardless of the use of linear M codes. Also, since not only formations of the feedback lines but also initial formations of the flip-flops may be selected as desired, the number of transmission channels can be increased by selective combination of a desired version and initial phase of the M code. Further, the simple circuit arrangement of the invention system permits monolithic circuit integration, and hence provides an inexpensive, reliable M code generator.

The embodiments of the invention in which an exclusive property or privilege is claimed are defined as follows:

1. A maximum length shift register sequences generator, comprising;
  a plurality of flip-flops which each have a clock input, a data input and a data output;
  a plurality of switching gates which each have first and second data inputs and a data output, said data output of each said switching gate being coupled to the data input of a respective one of said flip-flops;
  means for applying a clock pulse to said clock input of each of said flip-flops;
  a multiplexer having a plurality of data inputs which are each coupled to the data output of a respective one of said flip-flops, having a data output, and having select inputs which specify which one of said data inputs thereof is to be coupled by said multiplexer to said data output thereof;
  a plurality of AND gates which each have first and second input terminals, said first input terminal of each said AND gate being coupled to said data output of said multiplexer, and said AND gates each having an output;
  a plurality of feedback circuits which each have one input coupled to the output of a respective one of said AND gates, have a further input coupled to the data output of a respective one of said flip-flops, and have an output, one of said switching gates having its first data input coupled to said data output of said multiplexer and each of the others of said switching gates having its first input coupled to the output of a respective one of said feedback circuits;
  a first latch having a plurality of outputs which are each coupled to the second data input of a respective one of said switching gates;
  a second latch having a plurality of outputs which are each coupled to the second input terminal of a respective one of said AND gates;
  means for applying to each of said switching gates a gate control signal which selects a respective one of said first and second data inputs to be coupled by the switching gate to its data output;
  a third latch controlled by said gate control signal and having outputs coupled to said select inputs of said multiplexer; and
  a microprocessor responsive to said gate control signal to supply each of said first, second and third latches with instruction words.

2. A generator according to claim 1, wherein each said feedback circuit is an exclusive OR gate.

3. A maximum length shift register sequences generator, comprising:
  a plurality of code generating circuits which each include a flip-flop having a data input, a data output and a clock input, a switching gate having first and second data inputs and having a data output coupled to the data input of the flip-flop, and an AND gate having a first input terminal connected to the data output of the flip-flop, having a second input terminal, and having a data output;
  means for applying a clock pulse to said clock input of each of said flip-flops;
  a feedback circuit having a plurality of inputs which are each coupled to the data output of respective one of said AND gates and having an output, the first data input of the switching gate of one said code generating circuit being coupled to said output of said feedback circuit and the first data input of the switching gate of every other said code generating circuit being connected to the data output of the flip-flop of a respective said code generating circuit;
  a first latch having a plurality of outputs which are each coupled to the second data input of a respective one of said switching gates;

a second latch having a plurality of outputs which are each coupled to the second input terminal of a respective one of said AND gates;

means for applying to each of said switching gates a gate control signal which selects a respective one of the first and second data inputs thereof to be coupled by the switching gate to its data output; and means responsive to said gate control signal for supplying each of said first and second latches with instruction words;

the output of the flip-flop of said one of said code generating circuits producing an M code.

4. A generator according to claim 3, wherein said feedback circuit includes a plurality of exclusive OR gates each having a first input connected to the output of a respective one of said AND gates, having a second input, and having an output, a first said exclusive OR gate having its output connected to said first data input of said switching gate of said one code generating circuit, and a second said exclusive OR gate having its second input connected to ground, said second input of each said exclusive OR gate other than said second exclusive OR gate being connected to the output of a respective one of said exclusive OR gates other than said first exclusive OR gate.

5. A generator according to claim 3, wherein said means for supplying instruction words includes a microprocessor.

6. A maximum length shift register sequences generator, comprising:

a plurality of code generating circuits which each include a flip-flop having a data input, a data output and a clock input, and a switching gate having first and second data inputs and having a data output coupled to the data input of the flip-flop;

a plurality of AND gates each having first and second input terminals and having an output terminal;

means for applying a clock pulse to said clock input of each of said flip-flops;

a multiplexer having a plurality of inputs which are each coupled to the output of a respective one of said flip-flops, having an output which is coupled to said first input terminal of each of said AND gates and to said first input of said switching gate of one of said code generating circuits, and having select inputs which specify which one of said data inputs thereof is to be coupled by said multiplexer to its data output;

a first latch having a plurality of outputs which are each coupled to the second data input of a respective one of said switching gates;

a second latch having a plurality of outputs which are each coupled to the second input terminal of a respective one of said AND gates;

means for applying to each of said switching gates a gate control signal which selects a respective one of the first and second data inputs thereof to be coupled by the switching gate to its data output;

a third latch controlled by said gate control signal and having outputs coupled to said select inputs of said multiplexer;

a plurality of feedback circuits each having an output coupled to the first data input of the switching gate of a respective said code generating circuit other than said one code generating circuit, having a first input coupled to the output terminal of a respective one of said AND gates, and having a second input coupled to the output of the flip-flop of a respective one of said code generating circuits; and means responsive to said gate control signal for supplying each of said first, second and third latches with instruction words.

7. A generator according to claim 6, wherein each said feedback circuit is an exclusive OR gate.

8. A generator according to claim 6, wherein said means for supplying instruction words includes a microprocessor.

* * * * *

UNITED STATES PATENT AND TRADEMARK OFFICE
CERTIFICATE OF CORRECTION

PATENT NO. : 4 785 410

DATED : November 15, 1988

INVENTOR(S) : Masahiro HAMATSU et al

It is certified that error appears in the above-identified patent and that said Letters Patent is hereby corrected as shown below:

In the drawings, Sheet 3, Figure 4; please add a dot at the intersection of the line extending horizontally from flipflop SR1 to gate EXOR1 and the line extending vertically between flipflop SR1 and gate EXOR1, in order to show that these two lines are electrically connected.

Signed and Sealed this

Twelfth Day of February, 1991

Attest:

HARRY F. MANBECK, JR.

Attesting Officer

Commissioner of Patents and Trademarks